May 21, 1929.  T. R. EILENBERG  1,714,006
RACK FOR ELECTRIC CONDUITS
Filed March 3, 1923   2 Sheets-Sheet 2
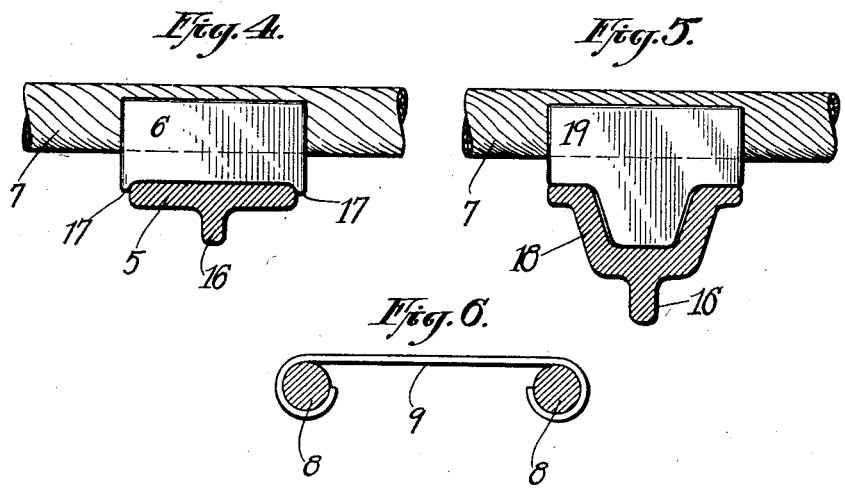
Inventor
THEO R. EILENBERG
By his Attorney Patented May 21, 1929.

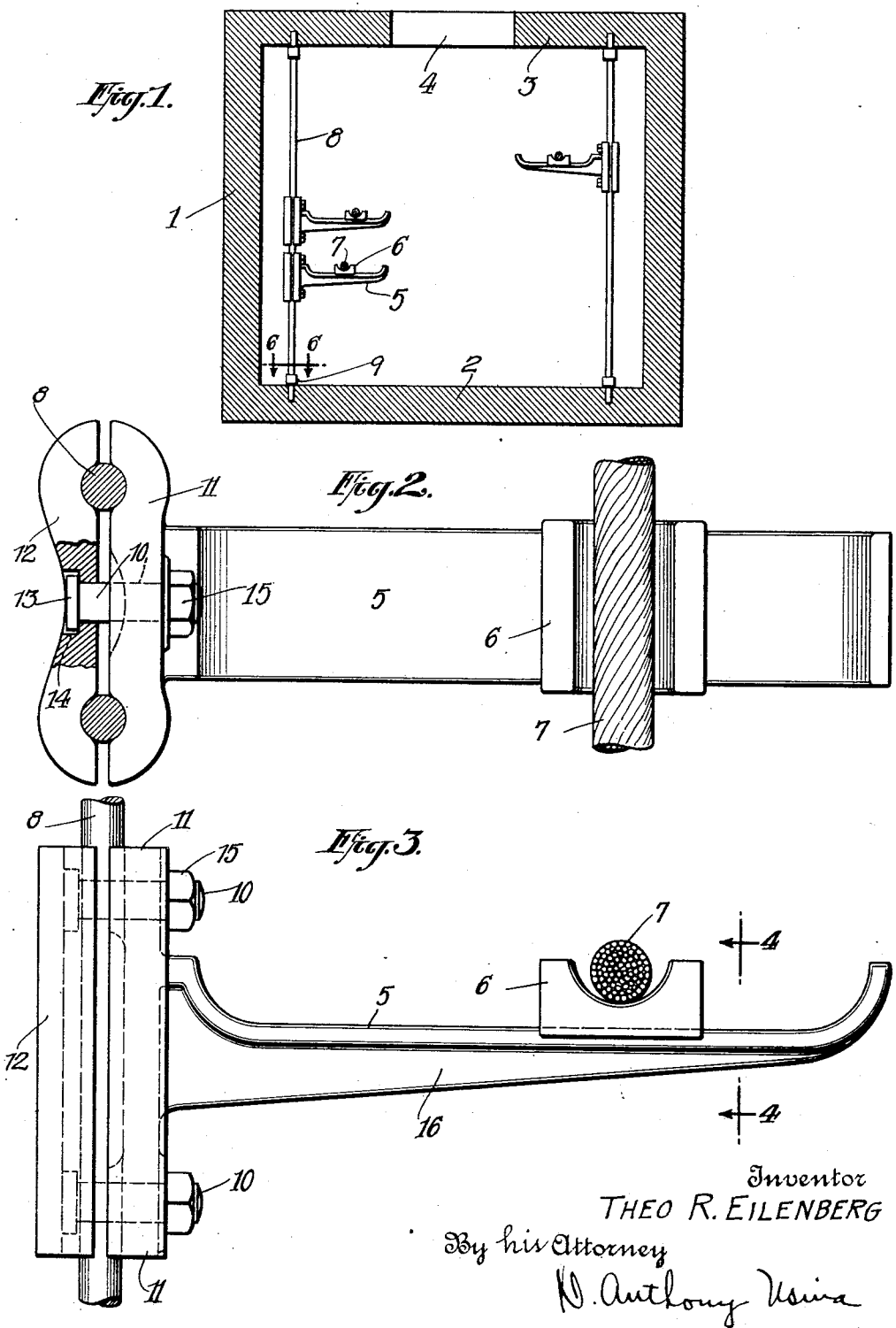

1,714,006

UNITED STATES PATENT OFFICE.

THEODORE R. EILENBERG, OF BRONX, NEW YORK, ASSIGNOR, BY MESNE ASSIGNMENTS, TO THOMAS E. MURRAY, JR., OF BROOKLYN, NEW YORK.

RACK FOR ELECTRIC CONDUITS.

Application filed March 3, 1923. Serial No. 622,663.

My invention aims to provide a rack for electric conduits for conveniently and properly supporting the cables carried through such conduits.

The accompanying drawings illustrate embodiments of the invention.

Fig. 1 is a vertical cross-section of a conduit at a manhole;

Figs. 2 and 3 are respectively a plan and a side elevation of an arm carrying a cable;

Fig. 4 is a cross-section on the line 4—4 of Fig. 3;

Fig. 5 is a similar view of modified shape;

Fig. 6 is a horizontal section along a line 6—6 of Fig. 1.

Referring to the embodiment of the invention illustrated, the portion of the conduit carrying the racks is made of concrete with side walls 1, bottom and top walls 2 and 3 and a manhole 4 in the latter. It is necessary to keep the cables separate and easily accessible, at least at these points in the conduit, and for this purpose they are carried on racks or supports of various sorts. The racks which I have provided for the purpose comprise arms 5, horizontal or substantially so, carried by one or more upright supports. Each arm is of a length to carry one or more blocks 6 of porcelain or other suitable composition upon which are directly supported the cables 7.

The support for these arms may consist, as shown in Figs. 1 to 6 of a pair of upright rods 8 spaced apart by straps 9 (Fig. 6) and embedded at their upper and lower ends in the concrete. Each arm is fastened to the uprights by means of bolts 10 passing through upright extensions 11 of the arms and through a clamping block 12; the parts 11 and 12 embracing the rods 8 between them. With such a method of fastening it will be observed that the arms can be mounted at any desired height and spaced vertically from each other. The bolts 10 have square heads 13 fitting in sockets 14 in the back of the clamping block 12 so as to hold the bolt from turning, and the nuts 15 are exposed on the inner faces of the flanges 11 so as to be easily accessible. By easing off the nuts the arm can be shifted up or down as desired on the support and then clamped firmly by tightening the nuts. The two rods 8 give stiffness in the longitudinal direction, that is lengthwise of the cable, and the flanges 11 give the necessary stiffness in the vertical direction, so that the arm will be held firmly in place.

The blocks 6 on which the cables are directly supported are so designed with relation to the arms 5 as to be movable along said arms but to be held substantially immovable against longitudinal movement. For example, in Fig. 4 arm 5 is shown as a flat plate stiffened by a rib 16; and the block 6 has a flat underside resting on the arm and has flanges 17 overlying the edges of the arm so as to prevent longitudinal movement.

In the alternative design, Fig. 5, the arm is made trough-shape in section as at 18 and the block 19 has its underside shaped to enter the trough of the arm and to thus prevent longitudinal movement.

The arm may be made of cast iron and of practically any shape desired in cross-section, or galvanized pressed steel may be used therefor. The rods 8 are preferably of brass or of copper coated steel.

Though I have described with great particularity of detail certain embodiments of my invention, yet it is not to be understood therefrom that the invention is restricted to the particular embodiments disclosed. Various modifications thereof in detail and in the arrangement of the parts may be made by those skilled in the art without departure from the invention as defined in the following claims.

What I claim is:

A device for supporting electric cables from an upright support comprising two posts mounted within the walls of a conduit and exposed on front and rear, said device comprising a horizontal arm having an upright portion adapted to engage the front of said posts, said upright portion being extended beyond the upper and lower edges of said arm to prevent vertical rocking thereof and having lateral extensions also adapted to engage the front of said posts to prevent horizontal rocking of the arm in combination with separate means adapted to pass between the posts and to secure the arm rigidly thereto at any desired height on said supports.

In witness whereof I have hereunto signed my name.

THEO. R. EILENBERG.